United States Patent
Tsujita et al.

(10) Patent No.: US 7,836,982 B2
(45) Date of Patent: Nov. 23, 2010

(54) COMPACT CRAWLER TYPE TRACTOR

(75) Inventors: Masafumi Tsujita, Osaka (JP); Kozo Kitayama, Osaka (JP); Kazuhisa Yokoyama, Osaka (JP); Yumiko Yamashita, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 265 days.

(21) Appl. No.: 12/084,110

(22) PCT Filed: Jan. 19, 2006

(86) PCT No.: PCT/JP2006/300723
§ 371 (c)(1),
(2), (4) Date: Apr. 25, 2008

(87) PCT Pub. No.: WO2007/049368
PCT Pub. Date: May 3, 2007

(65) Prior Publication Data
US 2009/0127007 A1 May 21, 2009

(30) Foreign Application Priority Data

Oct. 27, 2005 (JP) .............................. 2005-312270
Oct. 31, 2005 (JP) .............................. 2005-317650

(51) Int. Cl.
*B62D 11/00* (2006.01)

(52) U.S. Cl. ........................ 180/6.7; 180/9.1; 180/9.44; 180/6.48

(58) Field of Classification Search .................. 180/6.7, 180/6.48, 9.1, 9.44
See application file for complete search history.

(56) References Cited

U.S. PATENT DOCUMENTS

| | | | |
|---|---|---|---|
| 4,400,935 A * | 8/1983 | Louis .......................... | 60/431 |
| 6,286,620 B1 | 9/2001 | Légmán et al. | |
| 6,913,103 B2 * | 7/2005 | Kitasaka et al. .............. | 180/306 |
| 6,988,571 B2 * | 1/2006 | Okamoto et al. ........... | 180/6.48 |
| 7,210,293 B2 * | 5/2007 | Fukasawa et al .............. | 60/487 |
| 7,326,141 B2 * | 2/2008 | Lyons et al. .................. | 475/28 |
| 7,500,933 B2 * | 3/2009 | Baasch et al. ............... | 475/205 |
| 2004/0231907 A1 | 11/2004 | Ishii | |
| 2006/0048977 A1* | 3/2006 | Akashima et al. ............ | 180/6.6 |
| 2007/0198158 A1* | 8/2007 | Ishibashi et al. .............. | 701/50 |

FOREIGN PATENT DOCUMENTS

| | | |
|---|---|---|
| JP | 7-12722 A | 1/1995 |
| JP | 8-142906 A | 6/1996 |
| JP | 2002-337757 A | 11/2002 |
| JP | 2003-237618 A | 8/2003 |
| JP | 2003-291847 A | 10/2003 |
| JP | 2003-291848 A | 10/2003 |
| JP | 2004-330829 A | 11/2004 |
| JP | 2005-67606 A | 3/2005 |

* cited by examiner

*Primary Examiner*—Joanne Silbermann
*Assistant Examiner*—Tashiana Adams
(74) *Attorney, Agent, or Firm*—Birch, Stewart, Kolasch & Birch, LLP

(57) ABSTRACT

A compact crawler type tractor having an excellent turning feeling is provided. A hydraulic speed change mechanism for turning includes a hydrostatic transmission pump for turning and a hydrostatic transmission motor for turning, and is characterized in that the hydrostatic transmission pump for turning is a variable displacement pump, and an output of the hydrostatic transmission motor for turning is input into a differential mechanism. By combining the hydrostatic transmission pump for turning and the hydrostatic transmission motor for turning and the differential mechanism, an excellent turning feeling can be obtained.

20 Claims, 13 Drawing Sheets

COMPACT CRAWLER TYPE TRACTOR

TECHNICAL FIELD

The present invention relates to a compact crawler type tractor, wherein a hydrostatic transmission pump for turning (hereinafter referred to as "HST pump for turning") and a hydrostatic transmission motor for turning (hereinafter referred to as "HST motor for turning") are separately arranged, and in more detail, relates to a compact crawler type tractor and the like, wherein an output of the HST motor for turning is input into a differential mechanism and has an excellent turning feeling.

BACKGROUND ART

FIG. 11 is a perspective view showing a conventional compact wheel type tractor 97. This tractor 97 is a rear drive four-wheel vehicle, in general, this kind of wheel type tractor is commonly attached with a farm working machinery such as a tilling attachment, a levee forming attachment, a soil disinfecting attachment, a cultivation bed making attachment, a seed tuber planting attachment, and a mulch working attachment which are moved upward-and-downward and driven by hydraulic pressure and gears or the like. Therefore, since the wheel type tractor 97 attached with a farm working machinery is likely to lose easily a front-and-rear balance of vehicle and ground contact pressure of tires is high, there is the case that running performance on soft ground or irregular ground is not sufficient, especially in the case of a compact tractor, traction force is sometimes insufficient due to the compactness. In such a case, if the wheel type tractor 97 can be improved to a compact crawler type tractor, running performance on soft ground or irregular ground can be improved due to the reduction of ground contact pressure, and at the same time, traction force can be increased.

As such technology, for example, one improving to a new compact crawler type tractor by sharing a steering mechanism part of a wheel type tractor is exemplified (Patent Document 1). The Patent Document was created in view of the point that turning characteristics is not good due to the difference of a turning mechanism between a crawler type and a wheel type, more specifically, in the case of the conversion of a wheel type tractor into a crawler type one, turning characteristics is not good to turn a vehicle with decelerating a crawler at the inner side of turning by braking a driving sprocket on one side while operating a braking device on one side by depressing either a right or a left break pedal at the inner side of turning, and intended to enable to turn vehicle of a compact crawler type tractor by rotating operation of a circular steering handle and also to reduce cost by sharing the parts with utilizing a steering mechanism part provided on a wheel type tractor.

In addition, while a wheel type working vehicle can drive if wheels contact with ground even in the case that a balance is rather poor, there is a case that traction force is not sufficient because a front end lifts up in a crawler type working vehicle. In addition, since a compact crawler type tractor is mainly used in ill-drained paddy fields, it is necessary to set ground clearance high. Thus, a technology by which a front-and-rear balance and ground clearance of a tractor are adjusted with a simple and inexpensive structure, has been already disclosed (Patent Document 2). In Patent Document 2, a compact crawler type tractor was disclosed, which is equipped with the right and left crawler type running units that a crawler is windingly mounted between a driving sprocket wheel and a driven idler, and the compact crawler type tractor is made so as to enable to adjust a installing position of a crawler frame supporting the driving sprocket wheel and the driven idler in the front-and-rear direction and/or in the up and down direction to a vehicle frame. The compact drawler type tractor disclosed in Patent Document 2 is estimated that the tractor part is targeting at a middle-size or a large-size, and a front edge of a supporting member which attaches a crawler frame supporting a driving sprocket wheel and a driven idler to a vehicle, is mounted at the lower part of the tractor in front of a front edge of the crawler type running unit.

On the other hand, especially in a middle-sized or large-sized tractor, a technology by which a driving system of a compact crawler type tractor is simplified and turning characteristics is improved, was developed (Patent Document 3). For example, Patent Document 3 disclosed a compact crawler type tractor of a front drive crawler type tractor in which a hydrostatic transmission turning mechanism (hereinafter referred to as "HST mechanism for turning") to turn a vehicle is connected with a driving system located behind a backward-and-forward movement changeover mechanism for carrying a vehicle backward or forward, wherein the HST mechanism for turning is divided into a variable displacement pump and a fixed displacement motor, and the fixed displacement motor is connected with an input shaft of a planetary gear type differential mechanism without making a gear speed change mechanism for auxiliary speed change and the HST pump for turning work together. This tractor is connected with the above variable displacement pump by an output after auxiliary speed change of a running speed change mechanism, it is said that it is possible to keep a turning radius constant and to ensure the same operation feeling as a wheel tractor by making a vehicle speed proportionate with rotation of a steering motor.

In addition, as a compact crawler type tractor being lightweight, simple and low cost, and being provided with a construction of farm working machinery having a good front-and-rear balance and good operability in spite of short overall length, a front drive compact crawler type tractor was also disclosed, wherein a mission case and an axle case are constructed in an integrated fashion, and the mission case is supported by a front-and-rear connection frame arranged horizontally between a pair of right and left crawler running units, and the axle case is located in front of the connection frame (Patent Document 4).

Patent Document 1: JP-A-2000-159143
Patent Document 2: JP-A-2002-145134
Patent Document 3: JP-A-2004-17841
Patent Document 4: JP-A-2004-66913

DISCLOSURE OF INVENTION

Problem to be Solved by the Invention

As described above, though a compact crawler type tractor is suitable for ill-drained paddy field work and is able to increase traction force because the ground contact pressure is low, as shown in Patent Document 1 described above, there is a case where it is not possible to ensure ground clearance suitable for the ill-drained paddy field work by using simply a driving wheel of a wheel type tractor as a driving sprocket wheel. In particular, since right-and-left and up-and-down balance adjustment is highly required for a compact crawler type tractor, it is convenient if such control can be more easily adjusted. In this case, as the above Patent Document 2, in a fixing procedure, wherein a mounting hole is drilled on a crawler frame, and a hole to be mounted corresponding to the mounting hole is drilled on a vehicle frame, and then fixing is performed by using these holes while moving both in the forward-and-backward and up-and-down directions, the operation is troublesome because of a lot of positions to be fixed. In addition, in a compact crawler type tractor, the total weight is likely to be heavy because right and left crawler type running units are heavy compared with the wheels, and so the weight saving is strongly required.

In addition, even in a compact crawler type tractor, it is preferable to secure a good operation feeling in the same manner as in a middle-sized or large-sized crawler type tractor. However, it is difficult because of its structure to divert simply a hydraulic speed change mechanism for steering to turn a vehicle, a backward-and-forward movement changeover mechanism for moving a vehicle backward or forward and a variable displacement pump of a hydraulic speed change mechanism for turning and the like which are used for improving a turning feeling, to a compact crawler type tractor. In particular, since a compact crawler type tractor described in Patent Documents 3 and 4 is a front drive type equipped in other form with a front axle case at a front-under part of an engine separately from a transmission, its structure is different from a rear drive system. Therefore, it is not easy to produce a compact crawler type tractor of low cost, compact and rear drive by utilizing a basic structure of a compact rear drive wheel type tractor.

In addition, though the turning mechanism described in the above Patent Document 4 keeps a turning radius constant by making a vehicle speed proportionate with the rotation difference of right and left driving crawlers and this makes it possible to secure the same operation feeling as a wheel tractor, a vehicle turns rapidly at a high speed running if the vehicle speed and the turning radius are homologized. Therefore, if it is possible to vary the turning radius at the same vehicle speed, ride quality and operability are much improved.

In addition, in a conventional crawler type tractor, there were problems that turning becomes abrupt and a shock is accompanied, when a vehicle is turned by handle steering in the turning HST mechanism.

Consequently, it is an object of the present invention to provide a compact crawler type tractor being able to secure ground clearance suitable for ill-drained paddy fields, having a good operation feeling and being able to vary a turning pattern, by utilizing the structure of a rear drive compact wheel type tractor as much as possible.

In addition, it is another object of the present invention to provide a compact crawler type tractor producible by utilizing the structure of a rear drive compact wheel type tractor as much as possible.

It is still another object of the present invention to provide a compact crawler type tractor having a good turning feeling.

Means for Solving the Problem

The present inventors found that, in the production of a compact crawler type tractor, a compact crawler type tractor can be produced in low cost by sharing a basic structure of a wheel type tractor, and on this occasion, a good turning feeling can be obtained by connecting a hydraulic speed change mechanism for steering to turn a vehicle to a driving system located behind a backward-and-forward movement changeover mechanism for carrying a vehicle backward or forward, and by having the hydraulic speed change mechanism composed by a hydrostatic transmission pump for turning (hereinafter referred to as "HST pump for turning") and a hydrostatic transmission motor for turning (hereinafter referred to as "HST motor for turning"), and by inputting the output of the HST motor for turning to a differential mechanism, and completed the present invention.

In addition, the present inventors found that a pattern of turning radius can be varied depending on the amount of steering changeover by using the HST pump for turning as a variable displacement pump, and by using the HST motor for turning as a fixed displacement motor, or by changing the motor displacement in accordance with the pump displacement by using a variable displacement motor, and completed the present invention.

In addition, the present inventors found that a good turning feeling can be obtained because surge pressure generated between the HST pump for turning and the HST motor for turning at the start of turning of a vehicle by steering a handle, can be absorbed when the HST pump for turning and the HST motor for turning are separately arranged, and a throttle is mounted in a pipe connecting the HST pump for turning and the HST motor for turning, and completed the present invention.

Advantages of the Invention

According to the present invention, since a hydraulic speed change mechanism for steering to turn a vehicle is connected with a driving system located behind a backward-and-forward movement changeover mechanism for carrying a vehicle backward or forward and the HST pump for turning is connected with an auxiliary speed change shaft of a running speed change mechanism, the number of revolution close to a operating speed indicated by a driver is easily obtained and a turning speed in response to a vehicle speed can be obtained without requiring a complicated construction.

According to the present invention, since a variable displacement motor is arranged at the upper part of a transmission, motor maintenance and the like can be easily performed.

The compact crawler type tractor of the present invention has a good turning characteristic because the crawler frame is fixedly mounted with an upper body by at least 2 supporting members and a crawler type running unit is short compared with the total body length.

The compact crawler type tractor of the present invention can be produced at low cost because it is possible to produce by utilizing shared parts installed in a wheel type tractor.

The compact crawler type tractor of the present invention can absorb a surge pressure generated at the start of turning of a vehicle by rotating operation of a handle, by installing a throttle or a delay relief valve in a pipe connecting the HST pump for turning and the HST motor for turning. Accordingly, it is possible to provide a compact crawler type tractor having a good turning feeling.

Figure 1:
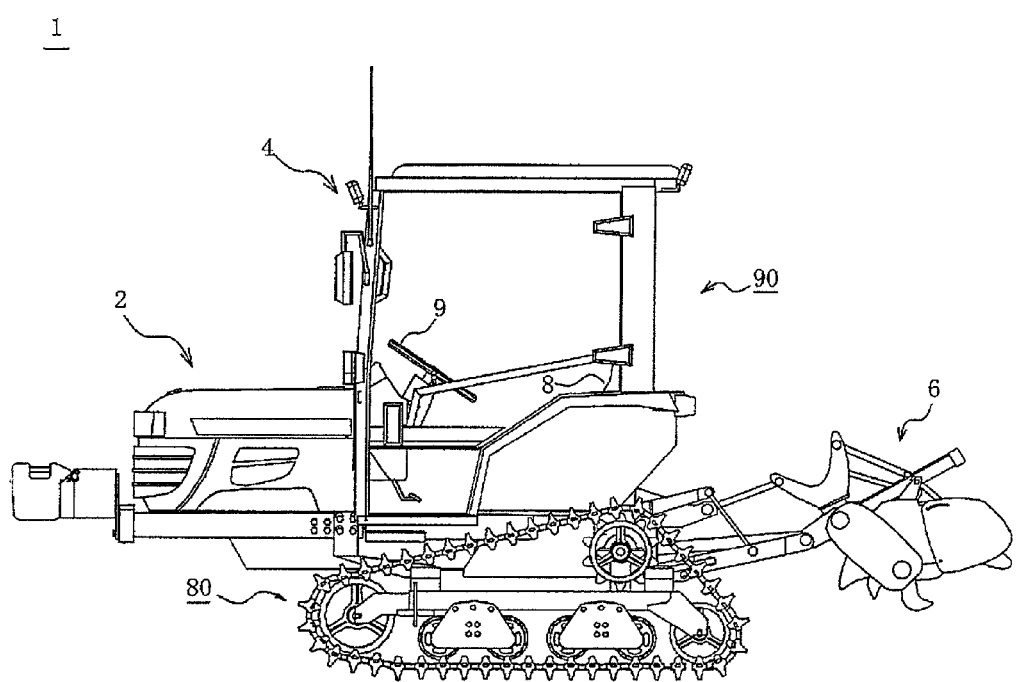
FIG. 1 is a side view showing a compact crawler type tractor as one example of a compact crawler type tractor of the present invention.

DESCRIPTION OF REFERENCE NUMERALS 1 crawler type tractor (vehicle), 2 bonnet, 3 engine, 4 cabin, 5 clutch housing, 6 farm working machinery, 7 backward-and-forward movement changeover mechanism, 8 driver's seat, 9 steering handle, 20L and 20R input shafts, 21 bevel gear, 22 pinion shaft, 23 mission case, 31 output shaft, 37 main shaft, 38 HST motor output gear, 39 main auxiliary speed change unit, 40L and 40R rear axle cases, 41 main speed change shaft, 42 main speed change gear, 45 auxiliary speed change shaft, 49 PTO counter shaft, 50L and 50R differential mechanisms, 58L and 58R driving output gears, 59L and 59R axle shafts (axle shafts), 60L and 60R driving sprockets (sprockets), 61 counter shaft, 63 input shaft of HST pump for turning, 72 HST pump for turning, 73 HST motor for turning, 80 crawler type running unit, 81L and 81R crawler frames, 84 supporting member, 85 driven idler, 87 supporting member, 91 PTO output shaft, 95 crawler belt, 97 wheel type tractor, 100 left tube, 101 right tube, 100a and 101a rings, 100b and 101b DRVs, 123 steering column, 125 steering shaft, 125' upper steering shaft, 125" lower steering shaft, 127 universal joint, 129 steering input shaft, 130 steering cam mechanism, 131 anti-clockwise turning eccentric cam, 132 clockwise turning eccentric cam, 133 connecting member, 135 clockwise turning roller, 137 anti-clockwise turning roller, 140 steering arm, 143 rod, 145 trunnion arm

BEST MODE FOR CARRYING OUT THE INVENTION

The present invention is a compact crawler type tractor having a crawler frame supporting driven idlers so as to be rotatable at both ends thereof and a driving sprocket mounted on a rear axle, and being provided with a crawler type running unit in which a crawler is windingly mounted around the driven idlers and the driving sprocket, at the lower part of an upper body, wherein a hydraulic speed change mechanism for steering to turn a vehicle is connected with a driving system located behind a backward-and-forward movement changeover mechanism for carrying the vehicle backward or forward, the hydraulic speed change mechanism includes a hydrostatic transmission pump for turning and a hydrostatic transmission motor for turning, the a hydrostatic transmission pump for turning is a variable displacement pump, and an output of the hydrostatic transmission motor for turning is input into a differential mechanism. The HST pump for turning is a variable displacement pump, and the HST motor for turning may be a fixed displacement motor or a variable displacement motor.

In addition, a throttle or a delay relief valve may be mounted in a pipe connecting the hydrostatic transmission pump for turning and the hydrostatic transmission motor for turning.

It should be noted that the HST pump for turning in the present invention is an HST pump which is used for turning; the HST pump has a charge pump and a movable swash plate, compresses an operation oil sent from the charge pump, changes a flow path by the tilt direction of the movable swash plate, and outputs the operation oil to a hydraulic motor with increasing or decreasing the flow rate by tilt angle; the HST motor for turning is an HST motor which is used for turning; the HST motor converts energy of operation oil delivered from the HST pump into rotation energy and outputs the rotation energy.

Figure 2:
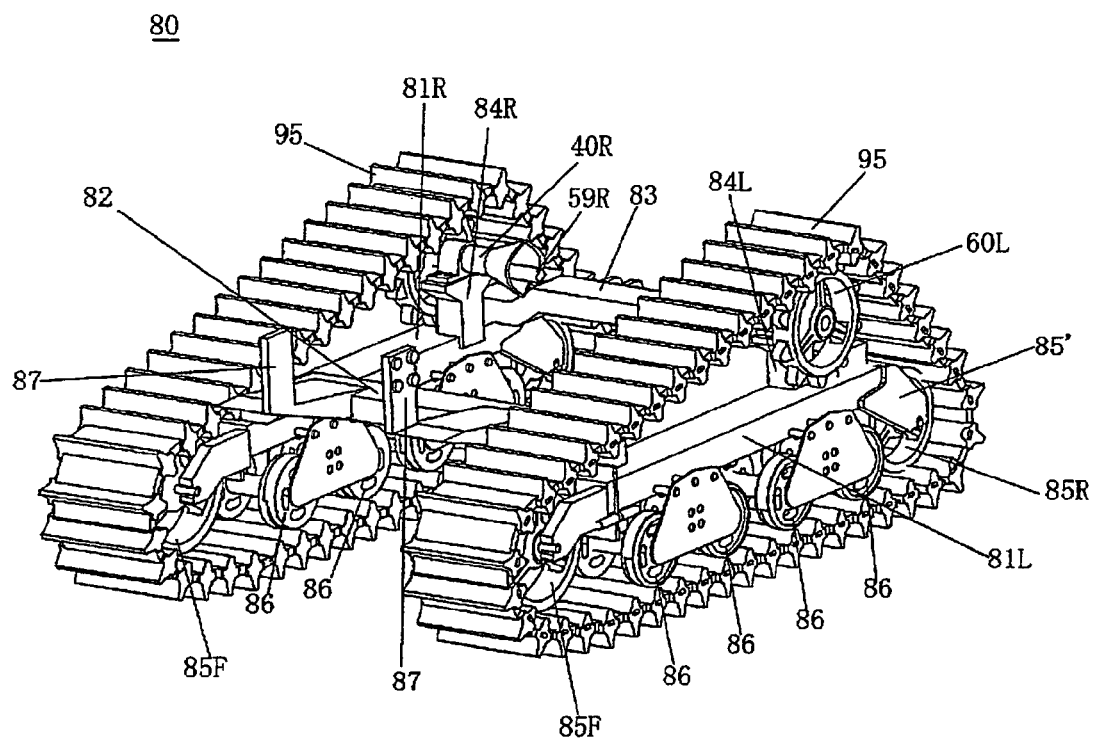
FIG. 2 is a perspective view showing a perspective view of a running part in a compact crawler type tractor of the present invention.
Figure 3:
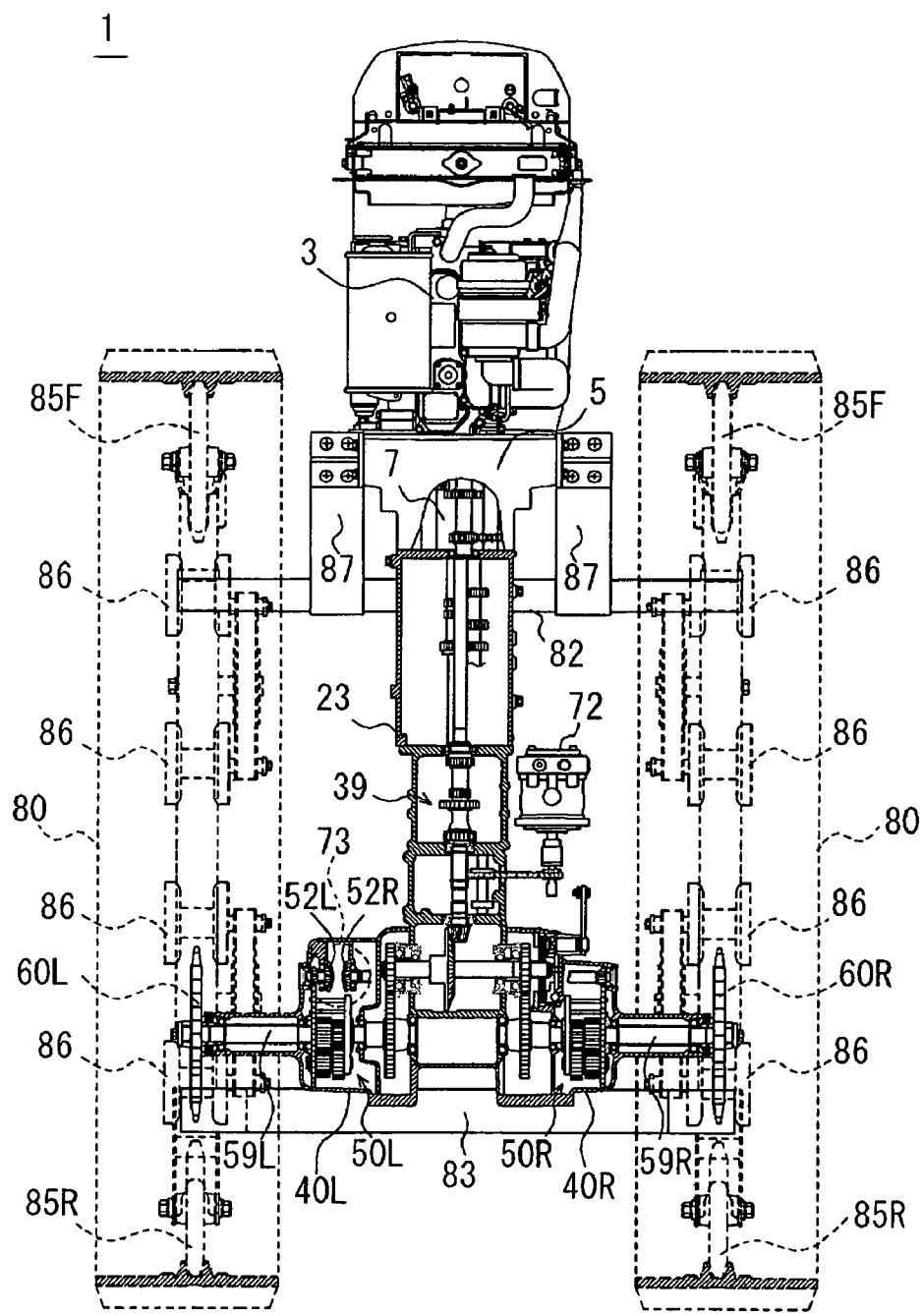
FIG. 3 is a plan-cross-sectional view of a compact crawler type tractor of the present invention.
Figure 4:
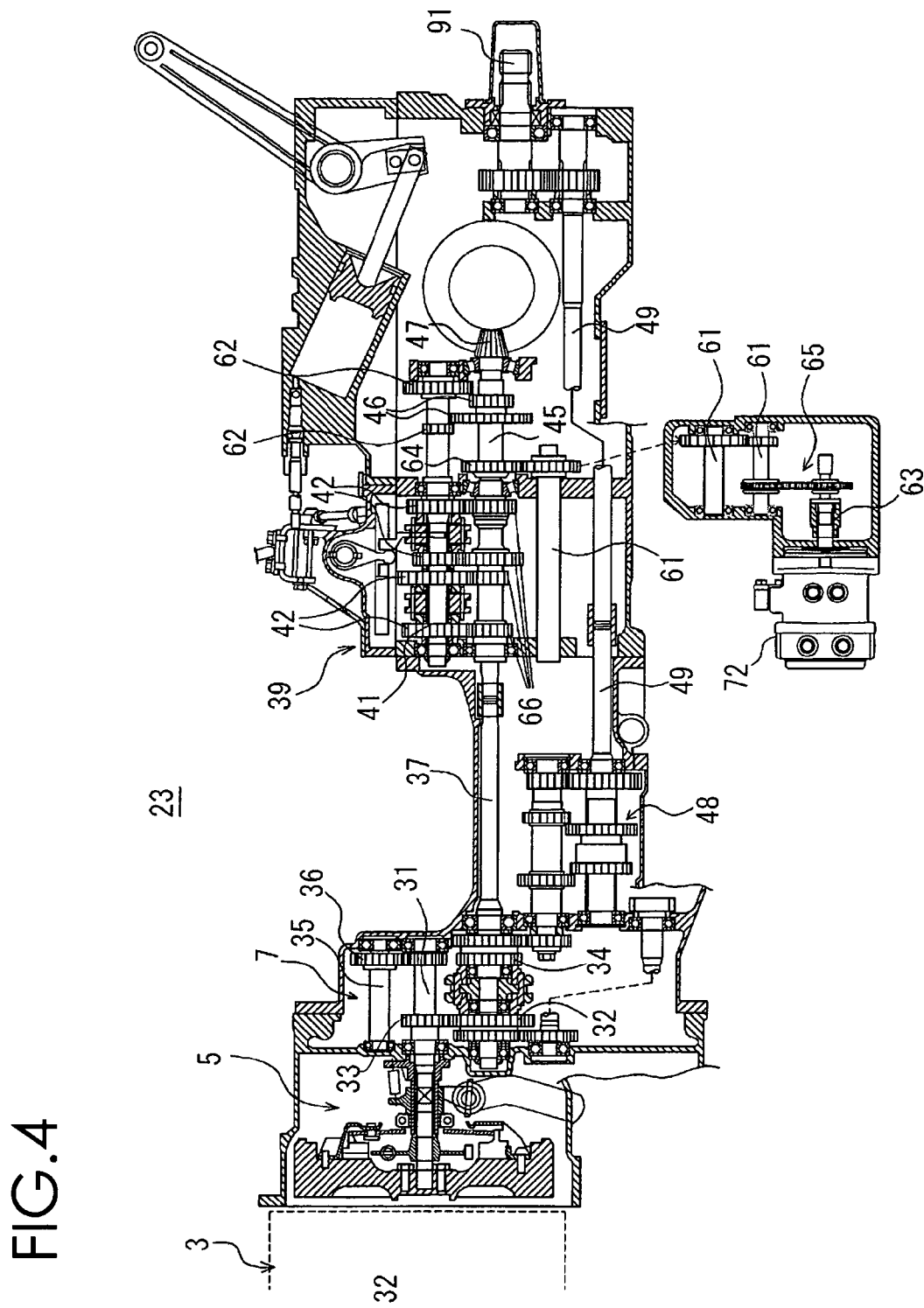
FIG. 4 is a side-cross-sectional view of a driving part in a compact crawler type tractor of the present invention.
Figure 5:
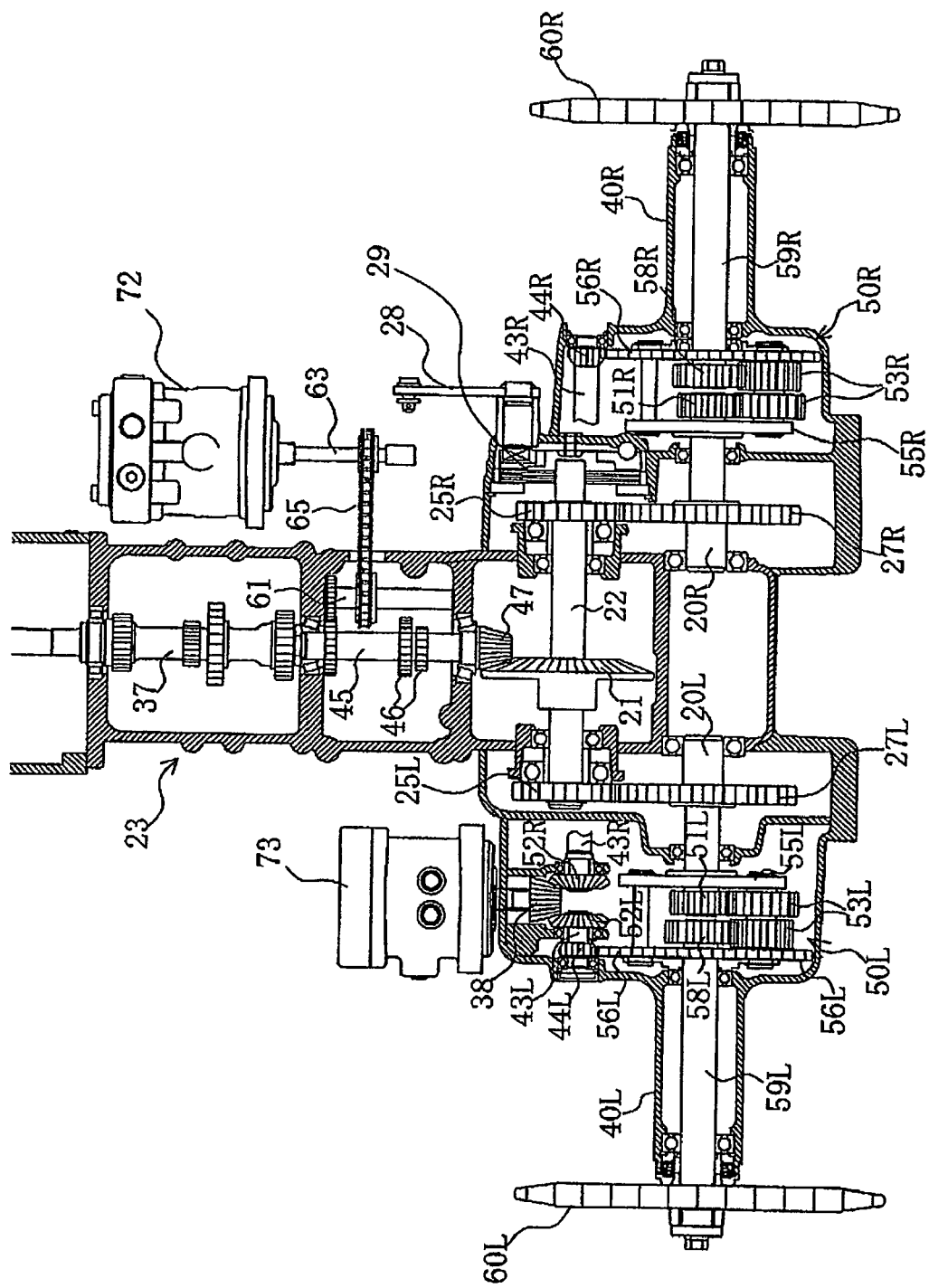
FIG. 5 is a view showing a differential structure of a compact crawler type tractor of the present invention.
Figure 6:
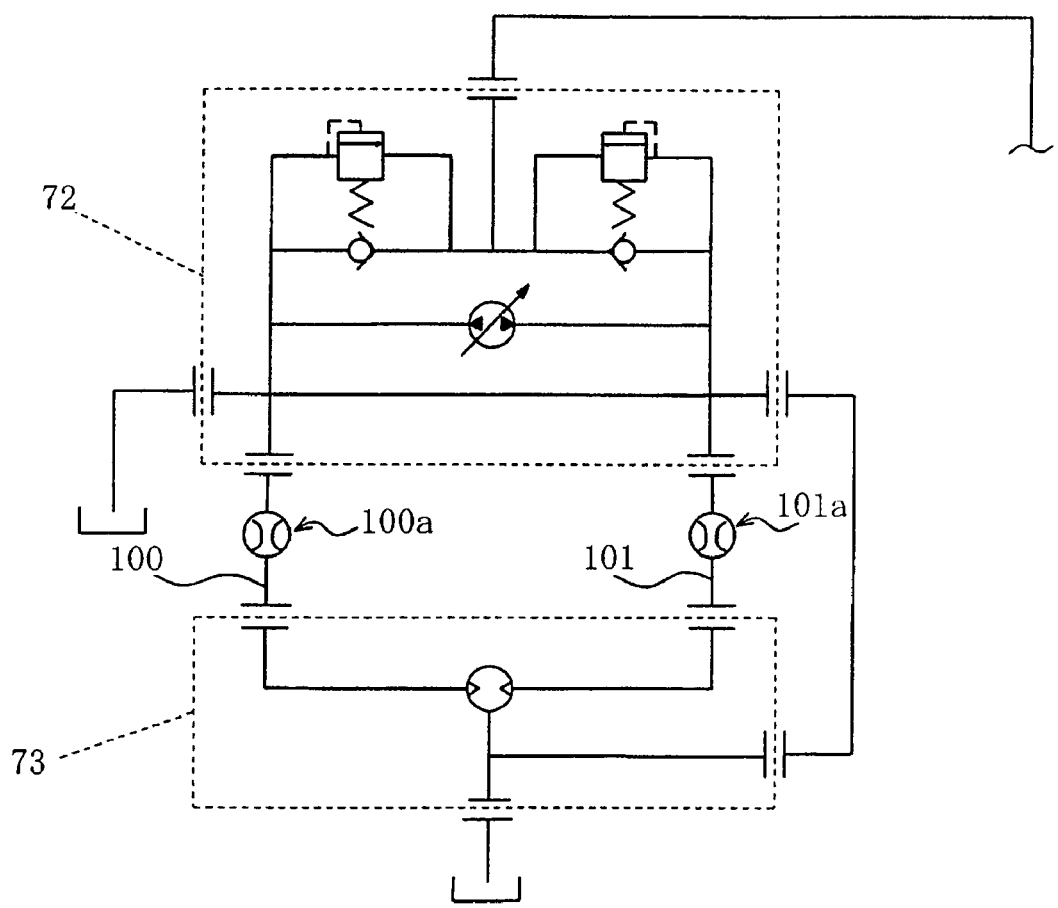
FIG. 6 is a skeleton view equipped with a throttle in a hydraulic system of the HST mechanism for turning in a tractor shown in FIG. 1.
Figure 7:
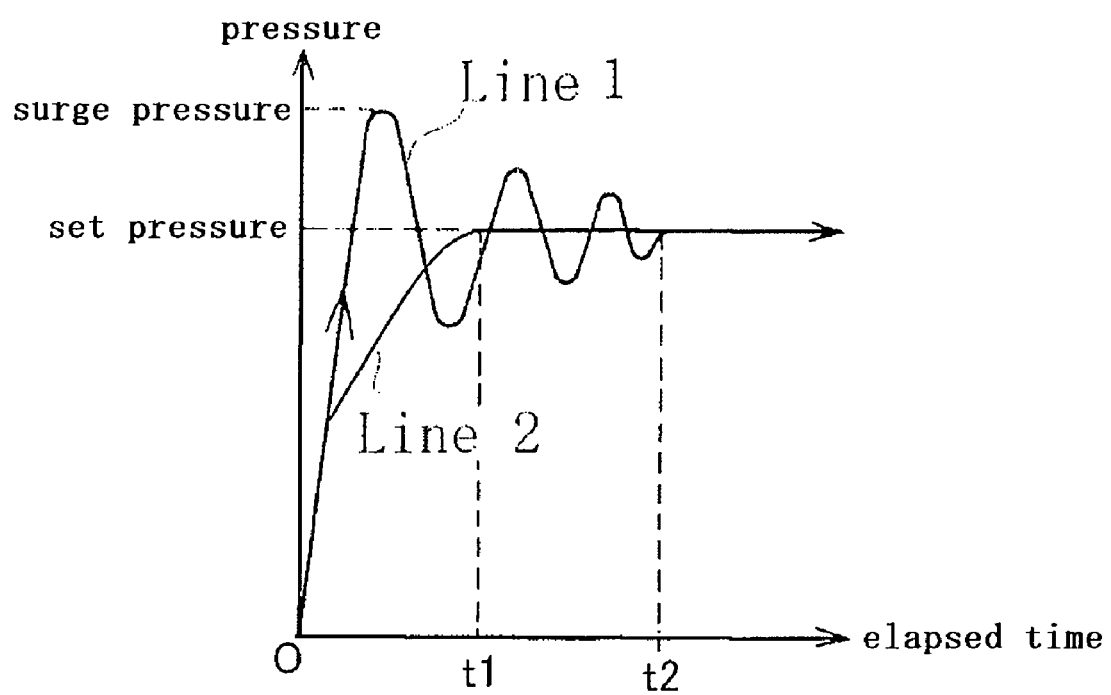
FIG. 7 is a graph showing hydraulic pressure of the HST turning system of the tractor shown in FIG. 1.
Figure 8:
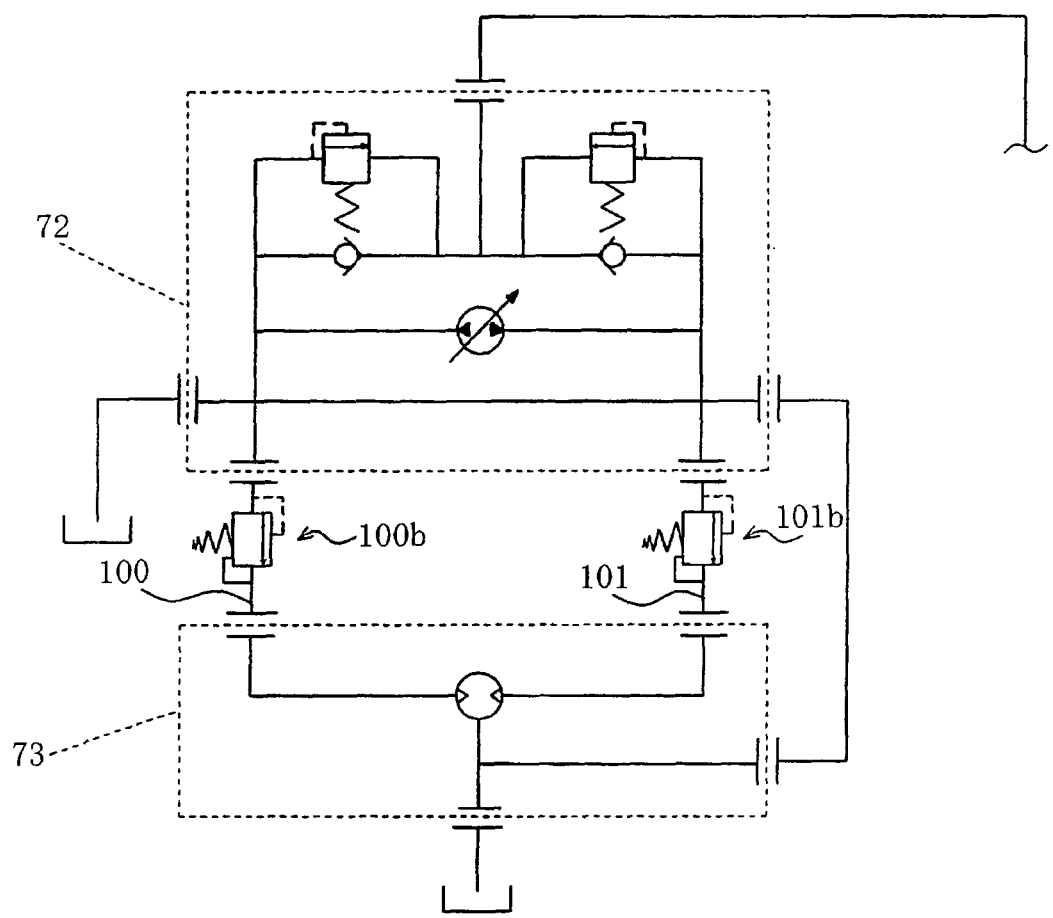
FIG. 8 is a skeleton view equipped with DRV in a hydraulic system in FIG. 6.
Figure 9:
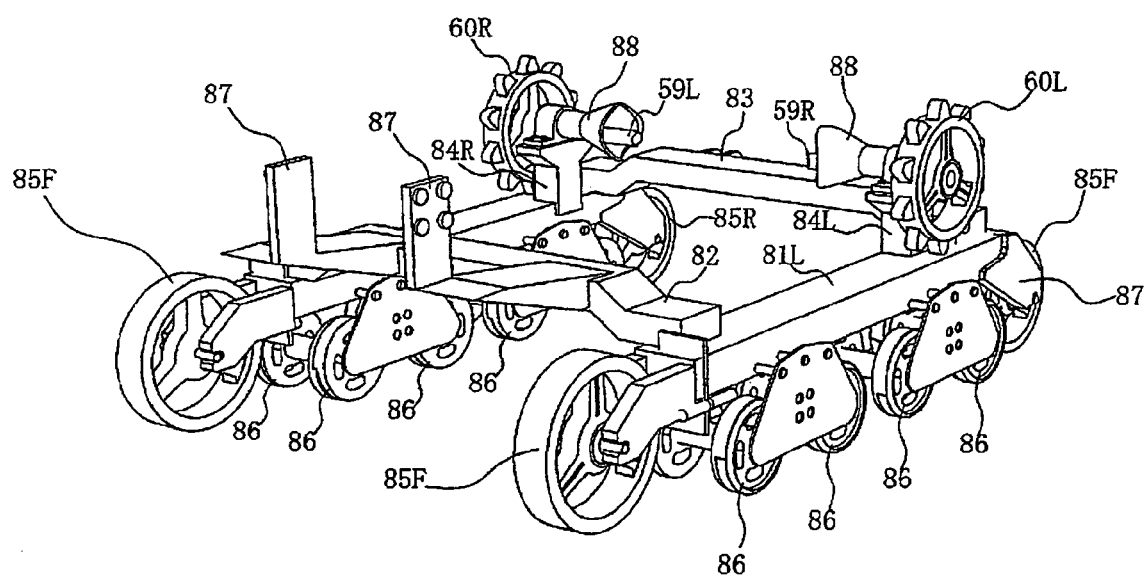
FIG. 9 is a perspective view of a frame structure of a crawler running unit of a compact crawler type tractor of the present invention.
Figure 10:
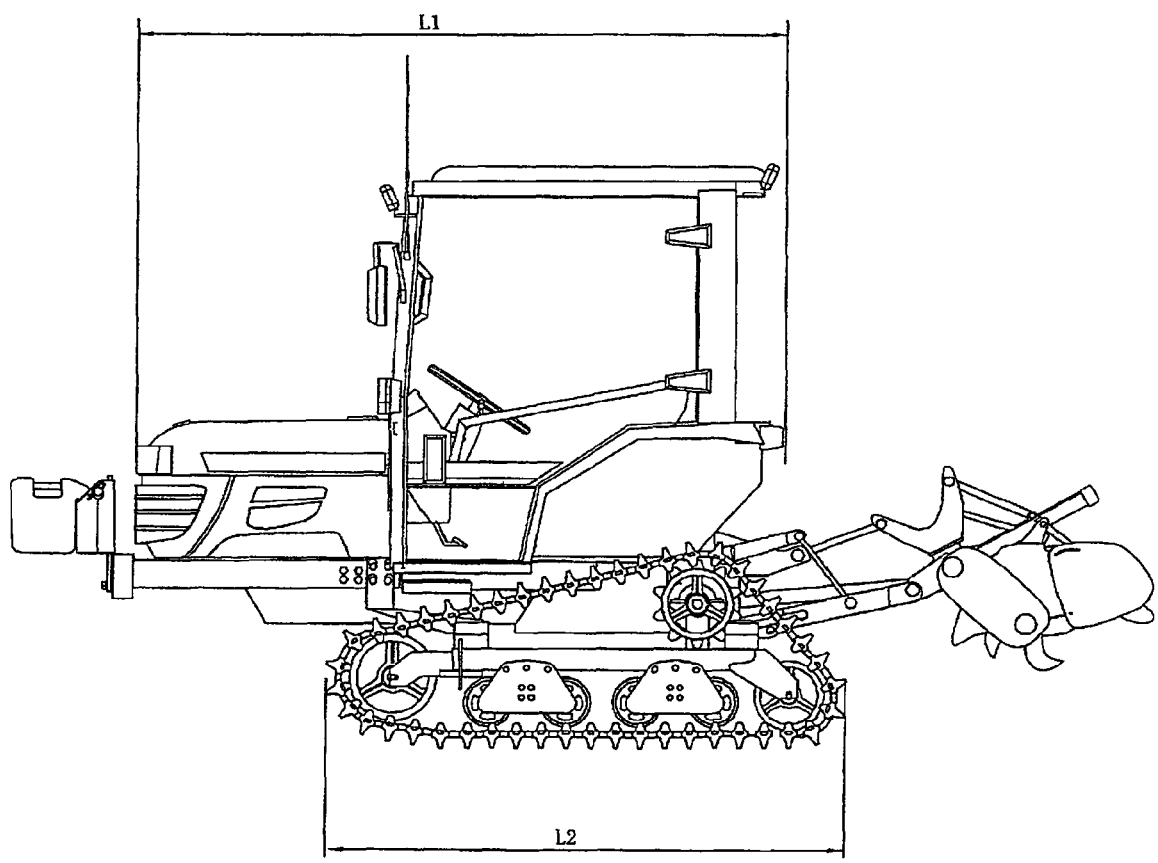
FIG. 10 is a view describing the ratio of a ground contact length (L2) of a crawler running unit to an overall length (L1) of an upper body.
Figure 11:
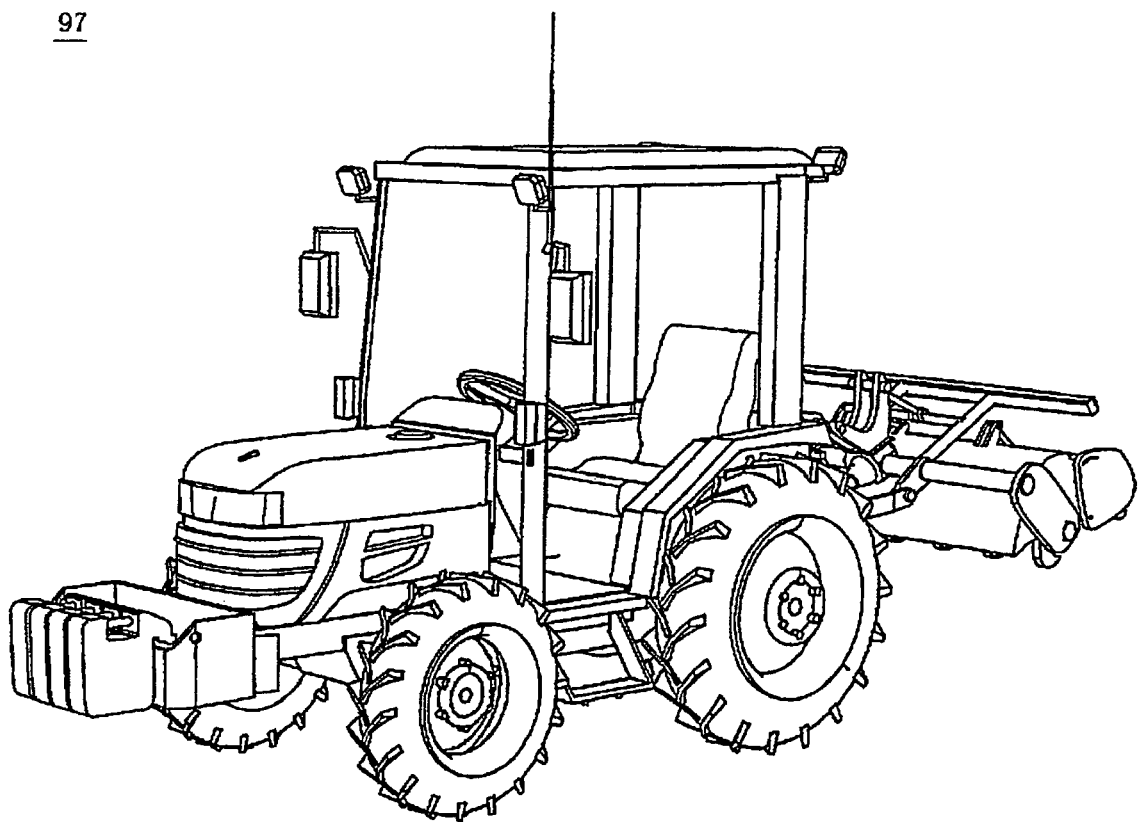
FIG. 11 is a perspective view showing a conventional wheel type tractor.

Best mode for carrying out the invention will be described below in detail with referring to drawings. FIG. 1 is a side view showing a compact crawler type tractor pertaining to one embodiment of the present invention; FIG. 2 is a perspective view of a running part in said tractor; FIG. 3 is a plan-cross-sectional view of said tractor; FIG. 4 is a side-cross-sectional view of a driving part of said tractor; FIG. 5 is a view showing a differential structure of said tractor; FIG. 6 is a skeleton view of a hydraulic system of the HST mechanism for turning equipped with a throttle; FIG. 7 is a graph showing hydraulic pressure of the HST turning system; FIG. 8 is a skeleton view of a hydraulic system equipped with DRV; FIG. 9 is a perspective view of a frame structure of a crawler running unit; FIG. 10 is a view describing the ratio of a ground contact length (L2) of a crawler running unit to a overall length (L1) of an upper body; FIG. 11 is a perspective view showing a conventional wheel type tractor; FIG. 12(a) is a segmental side view showing a connection of a steering handle and a trunnion arm of the HST pump for turning; FIG. 12(b) is a segmental longitudinal side view; and FIG. 13 is a view showing a steering cam mechanism.

(1) Vehicle

As shown in FIG. 1, a compact crawler type tractor (vehicle 1) of the present invention, consists of an upper body 90 located at the upper part of said vehicle 1 and a crawler type running unit 80 located at the lower part, and a bonnet 2 which covers an engine (not shown), is mounted in front of the upper body 90, and a cabin 4 for driving the vehicle 1 is mounted behind said bonnet 2. A steering handle 9 for driving the vehicle 1 is mounted in the front part of the cabin 4; a seat 8 is mounted in the rear part of the same; and a farm working machinery up-and-down lever, (not shown), a main speed change lever (not shown), an auxiliary speed change lever (not shown) and a PTO operation lever (not shown) and the like for operation of running of the vehicle, up-and-down of a farm working machinery and the like, are mounted at right or left side of said seat 8. In addition, to protect a driver in the case of a vehicle rollover, four safety frames are formed so as to cover entirely the driver's seat 8. In addition, a wide variety of farm working machinery 6 can be attached through a farm working machinery up-and-down attaching link at the rear part of the upper body 90.

As shown in FIG. 1, a crawler type tractor of the present invention is what is called a rear drive crawler type tractor, wherein driven idlers are supported so as to be rotatable at both ends of a crawler frame, and a driving sprocket installed on a rear axle is fixedly mounted on the crawler frame, a crawler type running unit, to which a crawler is windingly mounted between the driving sprocket and the driving idler, is installed in the lower part of an upper body. Since driven idlers are arranged at both ends of the crawler frame, the driving sprocket is arranged at the upper position of the driven idler, this makes it possible to secure high ground clearance for the driving sprocket.

As shown in FIG. 2, the crawler type running unit 80 has 2 crawler frames, right and left 81L and 81R, extended to the running direction, and 2 side frames, front and rear, 82 and 83, connecting this crawler frames 81L and 81R, and driven idlers 85 are supported to be freely rotatable at front and rear ends of the crawler frames 81L and 81R, and a plurality of equalizer track rollers 86 are supported to be freely rotatable between said 2 driven idlers 85R and 85F. A driving sprocket 60 is mounted at the upper position of these 2 driven idlers 85R and 85F and the equalizer track rollers 86, and a crawler belt 95 is wound approximately in a triangular shape with this driving sprocket 60 at its top and a line connecting between the 2 driven idlers 85R, 85F at its bottom, to form a crawler type running unit 80. In the present invention, though the driven idlers are arranged at both ends of the crawler frame, as shown in FIG. 2, it is acceptable to connect a driven idler 85R with the crawler frame 81L through a connecting member 85'. In addition, the crawler frame is not limited to be linear, however it is acceptable to be curved, or to have a curvature in front as shown in FIG. 2, and may connect with the driven idler 85F at the end. It should be noted that 84(R, L) and 87(R, L) in the drawing are supporting members to connect the crawler frame 81 and the upper body 90.

(2) Running System

A compact crawler type tractor of the present invention is equipped with a gear change-over type running speed change mechanism, and a hydraulic speed change mechanism including an HST pump for turning for steering to turn a vehicle and an HST motor for turning, is connected with a driving system located behind the backward-and-forward movement changeover mechanism for carrying a vehicle forward or backward. For example, as shown in FIG. 3, after being changed speed by a main auxiliary speed change unit 39, which is a gear change-over type running speed change mechanism arranged in a transmission case 23, a drive power from the engine 3 is input into differential mechanisms 50L and 50R mounted at right and left rear axle cases 40L and 40R, and axle 89 which drives driving sprockets 60L and 60R of the crawler type running unit 80, is rotated.

In this case, the HST pump 72 for turning for steering to turn a vehicle 1 and the HST motor 73 for turning, which turns a vehicle to the driving system located behind the backward-and-forward movement changeover mechanism 7 for carrying a vehicle 1 backward or forward are mounted respectively at the side part of the mission case 23 and at the upper part of the differential mechanism 50L in the mission case 23.

(3) Power transmission system

As shown in FIG. 4, an output from the engine 3 is input into the backward-and-forward movement changeover mechanism 7 from an output shaft 31 through a clutch housing 5. In said backward-and-forward movement changeover mechanism 7, a gear 33 of the output shaft 31 is engaged with a forward gear 32 installed on a main shaft 37 when a vehicle 1 moves forward, whereas when the vehicle 1 moves backward, the vehicle 1 moves backward or forward by engaging the output shaft 31 with a backward gear 34 through a counter gear 36 on a reverse idle shaft 35. The power passed said backward-and-forward changeover mechanism 7 is transmitted to the main auxiliary speed change unit 39 arranged further behind through the main shaft 37. For example, in the case that main speed change is 4speeds, the main shaft 37 and a main speed change shaft 41, which is located on the upper side of the main shaft 37, are connected through 4 main speed change gears 42 having different numbers of teeth. This main speed change gear 42 is always engaged with a gear 66 of the main shaft 37 and is rotated together. On the other hand, the main speed change gears 42 are loosely inlayed on the main speed change shaft 41 and by fixing selectively either of the 4 main speed change gears 42 on the main speed change shaft 41 by a main speed change lever (not shown), the main speed change shaft 41 is driven and rotated in response to the number of teeth of the main speed change gear 42 selected.

This driving power is transmitted to an auxiliary speed change shaft 45 from 2 gears 62 located in the rear part of the main speed change shaft 41 and fixedly mounted on said main speed change shaft 41 through an auxiliary speed change gear 46. In the case that auxiliary speed change is 2speeds, 2 auxiliary speed change gears 46 having different numbers of teeth are formed slidably on said auxiliary speed change shaft 45, these 2 gears 46 slide on the auxiliary speed change shaft 45 back and forth by an auxiliary speed change lever (not shown), and engage selectively with either of the gears 62 on the main speed change shaft 41, this makes it possible to obtain the power after auxiliary speed change.

The power after auxiliary speed change changes the rotation direction from the backward-forward direction to the right-left direction through a bevel gear 47 located on a rear end of the auxiliary speed change shaft 45, and is input to differential mechanisms 50L and 50R located behind the mission case 23 described below. Then, in the differential mechanisms 50L and 50R, the power is transmitted to axle shafts 59L and 59R, which drive sprockets 60L and 60R, and the sprockets 60L and 60R and fixedly mounted at the other end are driven and rotated.

It should be noted that, in the present invention, the rotational power after auxiliary speed change is input into an input shaft 63 of the HST pump for turning by a belt 65 driving or the like after going through a plurality of counter shafts 61.

(4) Differential Mechanism

As shown in FIG. 5, the driving power of the auxiliary speed change shaft 45 drives and rotates a pinion shaft 22 through the bevel gear 47 fixedly mounted at the rear end of said auxiliary speed change shaft 45 and a bevel gear 21 fixedly mounted on the pinion shaft 22 which engages with the bevel gear 47. Then, left and right gears 25L and 25R fixedly mounted on the both ends of the pinion shaft 22 engage with gears 27L and 27R fixedly mounted at an end of left and right input shafts 20L and 20R, and rotation of the pinion shaft 22 is distributed to the left and right input shafts 20L and 20R. Further, rotation of the left and right input shafts 20L and 20R is respectively input into sun gears 51L and 51R of left and right planetary gear systems 50L and 50R. It should be noted that, said planetary gear systems 50L and 50R consist of the sun gears 51L and 51R fixedly mounted on the sun gear input shafts 20L and 20R, planetary gears 53L and 53R installed with free rotation and revolution around said sun gears 51L and 51R, and carriers 55L and 55R which pivot said planetary gears 53L and 53R and also are loosely inlayed with free rotation on the sun gear input shafts 20L and 20R and axle shafts 59L and 59R, and the carrier gears 56L and 56R are additionally formed on the outer circumference of said carriers 55L and 55R. The planetary gears 53L and 53R are engaged with 58L and 58R fixedly mounted on the right and left driving output shafts 59L and 59R, and by rotation of said driving output gears 58L and 58R, sprockets

60L and 60R fixedly mounted on other ends of the driving output shafts 59L and 59R are driven and rotated.

At the same time, a movable swash plate is mounted inside of the HST pump 72 for turning, the tilt angle of the movable swash plate is varied in response to steering rotation, and the pump output adjusted in response to the tilt angle, is input into a differential mechanism.

The HST pump 72 for turning and the HST motor 73 for turning are connected with a pipe (not shown), and the output rotation number of the HST motor 73 for turning is controlled in response to the discharge rate from the HST pump 72 for turning. After the output of the HST motor 73 for turning and the output from the main auxiliary speed change unit 39 are combined in the differential mechanism 50, the driving sprockets 60L and 60R are differentially rotated and the vehicle 1 is turned.

For example, when the steering handle 9 is steered for right-left turning, the discharge rate of the HST pump 72 for turning is varied in response to the steering amount of the steering handle 9, consequently, an HST motor output gear 38 of the HST motor 73 for turning is driven and rotated, in accordance with rotation thereof, two reverse rotation gears of right and left, 52L and 52R, which engage with the HST motor output gear 38, are respectively reversely-rotated. The reverse rotation gears 52L and 52R are respectively fixedly mounted on each end of right and left turning driving shafts 43L and 43R, and differential gears 44L and 44R fixedly mounted on the other ends of the turning driving shafts 43L and 43R, are driven and rotated through said turning driving shafts 43L and 43R, hence right and left differential gears 44L and 44R are respectively reversely-rotated. The differential gears 44L and 44R are engaged with carrier gears 56L and 56R, and right and left carriers 55L and 55R are respectively reversely rotated. Though the planetary gears 53L and 53R pivoted by the right and left carriers 55L and 55R drive with revolution around the sun gears 51L and 51R, the right and left driving output shafts 59L and 59R are differentially rotated by the difference of revolution speed on this occasion, and the vehicle 1 is turned in the left or right direction. When the vehicle goes straight, it is the case that the left and right driving sprockets 60L and 60R have the same rotation speeds, and the vehicle 1 is turned when the left and right driving sprockets 60L and 60R have the different rotation speeds.

(5) Adjustment of Output of HST Pump 72 for Turning

A movable swash plate is arranged in the HST pump 72 for turning, the flow direction of operating oil is changed by the tilt direction, and the operating oil discharge rate from the pump is varied in response to the tilt angle. Said movable swash plate works with a trunnion arm of the HST pump 72 for turning, and the tilt direction and the tilt angle of the movable swash plate vary in response to circular arc movement of said arm. The rotation direction and the rotation drive power of the steering handle 9 are converted to the circular arc movement of the trunnion arm and are output, and the tilt angle of the movable swash plate is varied in response to the rotation amount of the steering handle 9.

Figure 12:
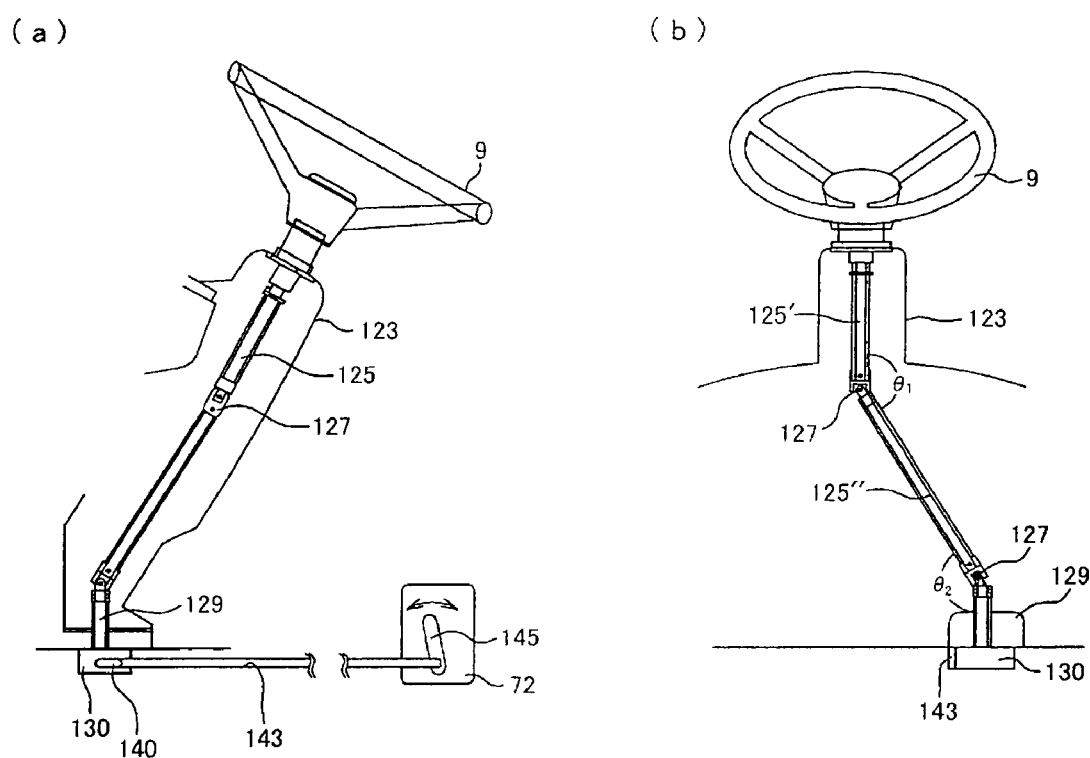
FIG. 12(a) is a segmental side view showing a connection of a steering handle and a trunnion arm of an HST pump for turning and FIG. 12(b) is a segmental longitudinal side view.
Figure 13:
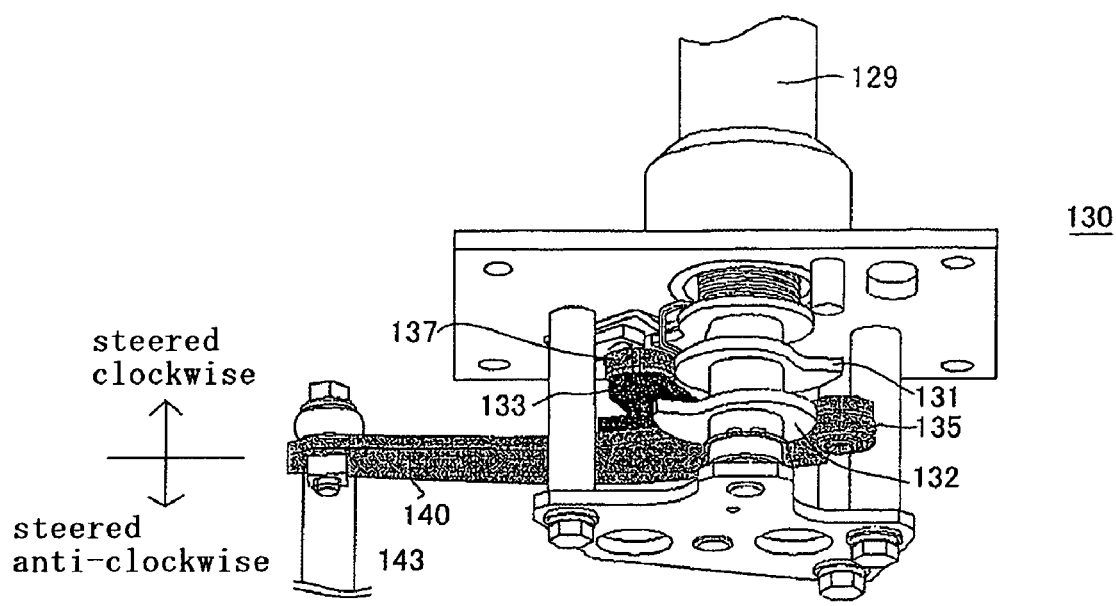
FIG. 13 is a view showing a steering cam mechanism.

As for the steering structure, as shown in FIG. 12(*a*), a steering shaft 125 is extended from the steering handle 9 through the inner part of a steering column 123, and is connected with a steering input shaft 129 by a universal joint 127 or a bevel gear or the like at the lower-end of the steering shaft 125. The rotation drive of the steering handle 9 is input into a steering cam mechanism 130 arranged in the lower part of the operation cabin 4 through the steering shaft 125, and said rotation power is converted to the backward-forward movement of the output shaft of a steering arm 140 or the like in said steering cam mechanism 130. Said output shaft is connected with a trunnion arm 145 of the HST pump 72 for turning by a rod 143, the backward-forward movement of the output shaft is input into the HST pump 72 for turning as the circular arm movement of the trunnion arm 145 through the rod 143, and the tilt direction and the tilt angle of the movable swash plate are varied.

In the steering cam mechanism 130, as shown in FIG. 13, an eccentric cam 131 for anti-clockwise turning, a connecting member 133, the steering arm 140 and an eccentric cam 132 for clockwise turning penetrates respectively into the steering input shaft 129, a roller 137 for anti-clockwise turning is fixedly mounted at the upper part of the connecting member 133, and said roller 137 is in contact with the eccentric cam 131 for anti-clockwise turning. In addition, a roller 135 for clockwise turning is fixedly mounted at the lower-end part of the steering arm 140, and said roller 135 is in contact with an eccentric cam 132 for clockwise turning. It should be noted that the connecting member 133 is fixedly mounted with the eccentric cam 132 for clockwise turning and the steering arm 140.

When the steering handle 9 turns clockwise, the steering input shaft 129 turns clockwise by the turning thereof, and the eccentric cam 132 for clockwise turning of the steering cam mechanism 130 turns clockwise. Said eccentric cam 132 for clockwise turning is in contact with the roller 135 for clockwise turning fixedly mounted at the end of the steering arm 140, and the rotation of the eccentric cam 132 for clockwise turning moves the steering arm 140 to the forward direction of the vehicle with the steering input shaft 129 as a central axis, through the roller 135 for clockwise turning. On the other hand, when the steering handle 9 turns anti-clockwise, the steering input shaft 129 turns anti-clockwise by the turning thereof, and the eccentric cam 131 for anti-clockwise turning of the steering cam mechanism 130, turns anti-clockwise. Said eccentric cam 131 for anti-clockwise turning is in contact with the roller 137 for anti-clockwise turning, and rotates the roller 137 for anti-clockwise turning with the steering input shaft 129 as a central axis, and at the same time, rotates the connecting member 133 fixedly mounted on said roller 137. Said connecting member 133 is connected with the steering arm 140, and moves the steering arm 140 to the backward direction of the vehicle in response to the rotation of said connecting member 133.

The steering arm 140 and the trunnion arm 145 of the HST pump 72 for turning are connected by the rod 143, and the trunnion arm 145 makes a circular arc movement in response to the traveling movement of the steering arm 140 in the backward-forward direction. The tilt direction and the tilt angle of the movable swash plate of the HST pump 72 for turning are varied in response to the circular arc movement. As described above, the flow direction of operating oil is reversed by the tilt of the movable swash plate, and this reverses the rotation drive direction of the HST motor for turning as well. Therefore, it is necessary to adjust the turning direction of the steering handle 9 and the tilt direction of the movable swash plate so that the turning direction of the steering handle 9 corresponds to the tilt direction of the movable swash plate, in the case that output of the HST motor 73 for turning is combined in the differential mechanism 50L.

In the present invention, in order that the steering arm 140, which is an output arm of the steering cam mechanism 130, and the trunnion arm 145 are connected by the rod 143, it is necessary that the steering cam mechanism 130 and the HST pump 72 for turning are arranged back and forth. Since the hydraulic speed change mechanism for steering of the present invention can separately mount the HST pump 72 for turning and the HST motor 73 for turning, the minimum ground clearance can keep high by arranging the HST pump 72 for turning at the side of the transmission 23. By arranging the HST pump 72 for turning at the side of the transmission 23, and the steering cam mechanism 130 in front of the same, it is possible to connect the trunnion arm 145 of the HST pump 72 for turning and the steering arm 140 of the steering cam mechanism 130 by the rod 143. Therefore, in the case that the HST pump 72 for turning is arranged at the right side of the transmission 23, the steering cam mechanism 130 may be arranged in the lower part of the right step of the operation cabin 4, and in the case that the HST pump 72 for turning is arranged at the left side of the transmission 23, the steering cam mechanism 130 is arranged in the lower part of the left step of the operation cabin 4. In this case, the HST pump 72 for turning is arranged so that the backward-forward movement of the steering arm 140, which outputs the rotation of the steering handle 9, works with the circular arc movement of the trunnion arm 145 of the HST pump 72 for turning.

In order to arrange the steering arm 140 in the lower part of the right or left step of the operation cabin 4, as shown in FIG. 12(*b*), it is advisable to connect the steering shaft 125, which are extended and fixed with the steering handle 9, and the steering input shaft 129, by a bevel gear or a universal joint 127 or the like, and in the same manner, to connect an upper steering shaft 125' and a lower steering shaft 125" which are formed by dividing the steering shaft 125 into two parts, upper and lower, by a bevel gear or a universal joint 127. In this case that the rotation drive of the steering handle 9 is transmitted to the upper steering shaft 125', the lower steering shaft 125" and the steering input shaft 129 by two universal joints 127, it is preferred that the angle ($\theta1$) between the upper steering shaft 125' and the lower steering shaft 125" and the angle ($\theta2$) between the lower steering shaft 125" and the steering input shaft 129 be approximately equal. This makes it possible to lead the upper steering shaft 125', the lower steering shaft 125" and the steering input shaft 129 into uniform motion.

In the present invention, by the construction described above, it is possible to vary the discharge rate of the HST pump 72 for turning in response to the steering amount of left-right turn of the steering handle 9, in accordance with this, to control the output from the HST motor 73 for turning, and to control a turning radius in response to the output.

(6) Steering Mechanism for Turning

In the present invention, the HST pump 72 for turning is a variable displacement pump. By using a variable displacement pump, it is possible to vary the displacement of the HST pump 72 for turning in response to the rotation of the steering handle 9, as described above, by an operator's rotational handling of a steering handle 9, and this makes stepless change of the output of said HST pump 72 for turning possible. In particular, in the present invention, since a hydraulic speed change mechanism for steering to turn a vehicle is connected with a driving system located behind the backward-and-forward movement changeover mechanism for carrying a vehicle forward or backward, the steering handle 9 never rotates reversely even at backward movement. In addition, since a variable displacement pump is used, it is possible to obtain the pump discharge rate proportional to the output of the driving system. In this case, when a fixed displacement motor is connected with the variable displacement pump, by inputting the power obtained by adding a main speed change and those after an auxiliary speed change into the HST pump 72 for turning, it is possible to keep a turning radius constant with making the steering motor rotation proportionate to vehicle speed by adjusting the discharge rate of the variable displacement pump.

On the other hand, in the present invention, a variable displacement motor may be used instead of the fixed displacement motor. In addition to the change of discharge rate by using the variable displacement pump, by using a variable displacement motor, the discharge rate can be changed moreover. If the discharge rate is changed by using the variable displacement pump, the rotation drive power of the HST motor output gear 38 of the HST motor 73 for turning is changed, and in accordance with the rotation thereof, the rotation of two reverse rotation gears, right and left, 52L and 52R which engage with the HST motor output gear 38, is changed, and finally the rotation drive power of the differential gears 44L and 44R fixedly mounted on the other ends of the turning driving shafts 43L and 43R is changed, and a turning radius can be changed even when vehicle speed is equal. In the case that the discharge rate is changed, for example, in 2-speeds by a variable displacement pump, a turning radius of a vehicle can be changed by changing the displacement of an HST pump 72 for turning relative to the displacement of an HST motor 73 for turning even at the same running speed. For example, by making the displacement of an HST motor 73 for turning small as compared with the displacement of an HST pump 72 for turning, it is possible to make a handle steering angle large and to make a turning radius of a vehicle large (soft mode) even at the same running speed, and by making the rotation number of an HST motor 73 for turning large as compared with the rotation number of the HST pump 72 for turning, it is possible to change turning radius of a sharp turn (spin mode) or the like.

In the case that a variable displacement motor is used, for example, switching to a spin mode or a soft mode described above can be performed by a mechanical method such as a manual lever, or an electrical method such as a solenoid. According to these methods, the operation can be performed without leaving a seat, and a turning radius can be easily changed.

Therefore, when a pivot turn or the like is carried out in a crawler type tractor, by changing the turning mode, it is possible to change the setting so as to make the pivot turn start steering angle small or large in response to operation conditions.

It should be noted that, although there is no limitation in the arrangement of an HST pump 72 for turning and an HST motor 73 for turning, it is preferable to arrange the HST pump 72 for turning at the side of the transmission 23. By this arrangement, as shown in FIG. 4, it is possible to input the rotation power after auxiliary speed change to the input shaft 63 of the HST pump 72 for turning by the belt 65 driving after going through a plurality of counter shafts 61. It should be noted that, a method to transmit the rotation power from the counter shaft to drive the HST pump 72 for turning, is not limited to a belt as described above, however a chain or a gear or the like is acceptable. Thus, by the transmittance from the counter shaft through a belt or the like, it is possible to arrange the HST pump 72 for turning position at an arbitrary position and it is possible to make the minimum ground clearance of the vehicle 1 high by arranging the HST pump 72 for turning at the side of the mission case 23, conventionally arranged in the lower part of the mission case 23 in many cases.

In addition, it is preferable to arrange the HST motor 73 for turning at a position higher than that of the mission case 23. In the case of making repairs on the HST motor 73 for turning, no effluence of oil stored in the mission case 23 from the HST motor 73 for turning and easiness of maintenance and detachment such as exchange of the HST motor 73 for turning, makes working efficiency high. In particular, in the case that the HST motor 73 for turning is arranged above the differential mechanism 50R and 50L, oil leaking down from the HST motor 73 for turning can be flowed down directly to the differential mechanism 50R and 50L. It is more preferable to be arranged in the proximity of the differential mechanism 50R and 50L to which the output of the HST motor 73 for turning is output, and for example it is preferable to be fixed on a rear axle containing the differential mechanism 50R and 50L.

(7) Throttle and Delay Relief Valve

In the crawler type tractor 1 of the present invention, in the case that the HST pump 72 for turning and the HST motor 73 for turning are separately arranged, rings 100a and 101a (throttles) or delay relief valves may be mounted in a left tube and a right tube 100 and 101 (pipes) connecting the HST pump 72 for turning and the HST motor 73 for turning.

FIG. 6 is a skeleton view showing a hydraulic system in the hydraulic speed change mechanism including the HST pump 72 for turning and the HST motor 73 for turning. The HST pump 72 for turning and the HST motor 73 for turning are connected by two pipes 100 and 101, and a closed circuit is formed. In accordance with steering of the steering handle 9, the tilt angle of the movable swash plate of the HST pump 72 for turning varies, and in response to this variation, the direction of the pressure oil flowing in said closed circuit varies, in the case of a right turn (or a left turn), the pipe 100 becomes a discharge side and the pipe 101 becomes a suction side, in the case of a left turn (or a right turn), the pipe 100 becomes a suction side and the pipe 101 becomes a discharge side. In the present invention, at the inside near the center of midway of such pipe 100 or 101, throttles 100a and 101a such as rings having a proper opening diameter, are fixedly mounted. When the steering handle 9 is steered clockwise (rightward) or anti-clockwise (leftward), as described above, in response to the steering amount, the pressure oil controlled the discharge rate by the movable swash plate (not shown) in the HST pump 72 for turning, which is connected through an auxiliary speed change arm (not shown), flows into the HST motor 73 for turning after passing through the ring 100a (or 101a) in the pipe 100 (or the pipe 101).

In FIG. 7, a variation with time of hydraulic pressure in the case (Line 1) that the throttles 100a and 101a are mounted in the pipe 100 and the pipe 101 in FIG. 6, and in the case (Line 2) that the pipes are not mounted. As shown in FIG. 7, in Line 2, a pressure is adjusted to a set pressure at elapsed time t1, however, in Line 1, since a pressure varies due to surge pressure generated by the presence of the movable swash plate, it took t2 to be stabilized to a set pressure (P1). The details of such early stabilization is not clear, however, it is conceivable that the inflow of surge pressure to the HST motor 73 for turning is prevented by installing rings and consequently the time required for a stabilization of oil pressure can be shortened. Therefore, since output of the HST motor 73 for turning, which is early controlled, is combined with the output from the main auxiliary speed change unit 39 at the differential mechanism 50R and 50L, a smooth turning feeling can be obtained. It is possible to install rings having different opening diameter instead of rings 100a and 101a in the pipe 100 and the same 101 and it can be easily performed to change a radius of the throttle flexibly depending on the degree of turning feeling of the vehicle 1. It should be noted that, the throttles installed in the pipe 100 and the pipe 101 are not limited to the rings 100a and 101a having an appropriate opening diameter, however it is acceptable to use by reducing the pipe diameters at each midway part of the pipe 100 and the pipe 101 to appropriate diameters.

According to the present invention, a delay relief valve (DRV) can be used instead of the throttle. A hydraulic system of a hydraulic speed change mechanism using such DRV is shown in FIG. 8. In FIG. 8, DRVs 100b and 101b are installed at the same positions where the throttles are respectively installed in the pipe 100 and the pipe 101. In these DRVs 100b and 101b, the relief springs, the spools and the like (not shown in detail), are mounted inside, and pressure oil from the HST pump 72 for turning retreats the spool against elastic force of the relief spring in the DRV 100b or 101b by the turn of the vehicle 1 accompanied with the steering of the steering handle 9, this makes it possible to send pressure oil, in which surge pressure has been absorbed, to the HST motor 73 for turning. Furthermore, it is possible to adjust the time required for surge pressure of pressure oil to reach a peak by changing elastic force of the relief springs in DRVs 100b and 101b. That is, if an elastic force of the relief springs is made strong, it takes longer time to absorb surge pressure of pressure oil, and conversely if elastic force of the relief springs is made weak, it takes shorter time to absorb surge pressure of pressure oil, therefore it becomes possible to adjust the degree of turning feeling. In addition, since adjusting devices (not shown) or the like to change elastic force of the relief springs are installed at the outer sides or the like of the DRVs 100b and 101b, it is possible to adjust elastic force of the relief springs easily from the outside.

It should be noted that, the throttles such as rings or DRVs are not limited to be installed both in the pipe 100 and the pipe 101 at the same time, however it is acceptable to be installed only in one side, in the pipe 100 or in the pipe 101. In addition, a position for rings or DRVs and the like to be installed, is not limited to near the center of midway of the pipe 100 or the pipe 101, however any place in the pipe 100 or the pipe 101 between the HST pump 72 for turning and the HST motor 73 for turning is acceptable.

(8) Upper Body and Crawler Type Running Unit

In a crawler type tractor of the present invention, it is preferable that the crawler frame of a crawler type running unit is fixedly mounted with the upper body by at least two supporting members. In the case of being fixedly mounted by such a small number of members, it is possible to attach right-and-left crawler type running units on the upper body simply and to separate the same easily, and furthermore to move the same forward or backward easily in response to weight balance variation caused by equipment and the like added to the upper body as an option.

Since fixing positions of the upper body and the right-and-left crawler type running units are decided by weight balance to the upper body, in the case of a compact upper body, it is possible to mount the upper body just by only mounting and fixing the upper body 90 on a pair of right and left crawler frames 81R and 81L through supporting members 87R, 87L, 84R, 84L. However, if one crawler frame is fixed only at one position, the total weight of the crawler frame weighs only on said position and causes rear-side imbalance, which results in such a problem that the front part of the crawler lifts up when running in ill-drained paddy fields or attaching a farm working machinery at the back. Therefore, fixing is made at least by two supporting members. It is possible to deconcentrate a stress on the support position by supporting the vehicle main body and the frames at two positions. In this case, according to the present invention, in addition to the above described positions for fixing the upper body 90 and the crawler frame 81R and 81L, the fixing with the upper body 90 is performed by a supporting member in the rear part of the vehicle behind the front edge of the crawler type running unit. Conventionally, as described for example in JP-A-2002-2523, the fixing with the upper body 90 is performed by a supporting member extending to the front part of the vehicle before the crawler type running unit 80, however, according to the present invention, the fixing with the upper body can be performed by a supporting member in the rear part of the vehicle behind the front edge of the crawler type running unit by adjusting weight balance with devising the arrangement or the like of the driving system, as described below. In addition, because of a good gravity center balance, stable running can be obtained even though the crawler is short.

According to the present invention, each of right and left crawler frames 81R and 81L is fixedly mounted on the upper body 90 at least by two supporting members, and each of the fixing positions is located in the rear part of the vehicle behind the front edge of the crawler type running unit 80. For example, as shown in FIG. 9, the supporting members 87R, 87L, 84R and 84L are mounted upward from the front part and the rear part of the crawler frame 81L, and each of them is fixedly mounted with the upper body 90. There is no limitation on a fixing position of the upper body 90, however, for example, the supporting members 87R and 87L can be fixed on the side of a clutch housing 5 of the upper body 90, and the supporting members 84R and 84L can be fixed on rear axle cases 40L and 40R. There is no limitation particularly on a fixing position of the upper body 90, however, according to the present invention, fixing positions of the supporting members 87R, 87L, 84R and 84L and the upper body 90 are located in the rear part of the vehicle behind the front edge of the crawler type running unit 80, therefore it is possible to fixedly mount on a structure such as a clutch housing 5 arranged above the crawler type running unit 80 only through a supporting member 84R,84L,87R,87L and it is unnecessary to provide a special fixing position in the lower part of the upper body 90. Hence, the total weight of the vehicle can be reduced.

In addition, according to the present invention, as shown in FIG. 10, ground contact length (L2) of the crawler running unit to the overall length (L1) of the upper body, that is, L2/L1, is equal to or greater than 0.5. According to the present invention, since the ground contact length of the crawler running unit can be shortened in the range described above, turning operation becomes easy. Further, since a climbing angle can be set appropriately high, it is possible to ensure a clearance under the front part of a body, and to prevent a roll-in of a salience in a cultivated field, therefore turning characteristics is improved regardless of conditions of a cultivated field face and a stable turning operation is ensured even at the corner in a small cultivated field. In addition, since the ground contact length of the crawler running unit is small, the total weight can be reduced. As described above, since the total weight of the vehicle is reduced, ground contact pressure can be held small although the ground contact length of the crawler running unit is small and turning characteristics can be improved. It should be noted that, the length of a farm working machinery attached at the front or rear part is not included in the overall length (L1) of the upper body.

In a crawler type tractor of the present invention, it is preferable to fix a crawler frame 81R and 81L on an upper body 90, as shown in FIG. 9, by fixing the supporting members 87R and 87L on the upper body with bolts, and to fix the supporting members 84R and 84L on the rear axle case 40L and 40R with bolts. If bolts are used, the fixing can be simply done without using a new attaching tool.

(9) Miscellaneous

Speed reduction is performed through a center brake installed at one side of the pinion shaft 22. If a brake pedal (not shown) is operated by driver's operation, a brake arm 28 is linked and turns, and brake action is generated at the pinion shaft 22 in accordance with the turn of the brake arm 28, which causes speed reduction of the vehicle 1. In particular, since a brake plate 29 is located at the right end of the pinion shaft 22, a brake case, in which the brake plate 29 and the brake arm 28 or the like are stored, can be integrated with the right rear axle case 40R, in which the right planetary gear system is stored. It should be noted that, if the HST motor 73 for turning is located on a left rear axle case 40L, the weight of a brake mechanism arranged on the right rear axle case 40R and weight of the HST motor 73 for turning arranged on the left rear axle case 40L are balanced and weight balance of the vehicle 1 can be maintained.

A farm working machinery is driven through a PTO output shaft 91. As shown in FIG. 4, one part of an output of the engine 3 is connected with a PTO counter shaft 49 through a PTO speed change gear 48 from the backward-and-forward movement changeover mechanism 7, and transmitted to the PTO output shaft 91 at rear side of a vehicle.

Although the present invention has been explained on a tractor as one sample of a crawler type working vehicle, this invention is not limited thereto and can be applied to a combine using crawlers, or the like, also, a power shovel and a bulldozer or the like as a construction working machinery, and any working vehicles equipped with crawlers.

INDUSTRIAL APPLICABILITY

According to the present invention, a compact crawler type tractor, which has a good turning feeling with a simple structure and a high minimum ground clearance, is provided, therefore the present invention is useful.

The invention claimed is:

1. A compact crawler type tractor comprising:
a crawler frame supporting driven idlers so as to be rotatable at both ends thereof and a driving sprocket mounted on a rear axle, and being provided with a crawler type running unit in which a crawler is windingly mounted around said driven idlers and said driving sprocket, at the lower part of an upper body;
a hydraulic speed change mechanism for steering a vehicle connected with a driving system;
a backward-and-forward movement changeover mechanism for carrying the vehicle backward or forward;
said hydraulic speed change mechanism including a hydrostatic transmission pump for turning and a hydrostatic transmission motor for turning, said hydrostatic transmission pump for turning and said hydrostatic transmission motor for turning located behind said backward-and-forward movement changeover mechanism; and
said hydrostatic transmission pump for turning is a variable displacement pump, and an output of said hydrostatic transmission motor for turning is input into a differential mechanism, the hydrostatic pump and the hydrostatic transmission installed closely to one another and in the vicinity of the transmission.

2. A compact crawler type tractor comprising:
a crawler frame supporting driven idlers so as to be rotatable at both ends thereof and a driving sprocket mounted on a rear axle, and being provided with a crawler type running unit in which a crawler is windingly mounted around said driven idlers and said driving sprocket, in the lower part of an upper body;

a hydraulic speed change mechanism for steering a vehicle connected with a driving system;
a backward-and-forward movement changeover mechanism for carrying the vehicle backward or forward;
said hydraulic speed change mechanism includes a hydrostatic transmission pump for turning and a hydrostatic transmission motor for turning;
said hydrostatic transmission pump for turning is a variable displacement pump, and said hydrostatic transmission motor for turning is a fixed displacement motor,
wherein said hydrostatic transmission pump for turning and said hydrostatic transmission motor for turning are located behind said backward-and-forward movement changeover mechanism, the hydrostatic pump and the hydrostatic transmission installed closely to one another and in the vicinity of the transmission.

3. A compact crawler type tractor having a crawler frame supporting driven idlers so as to be rotatable at both ends thereof and a driving sprocket mounted on a rear axle, and being provided with a crawler type running unit in which a crawler is windingly mounted around said driven idlers and said driving sprocket, in the lower part of an upper body;
a hydraulic speed change mechanism for steering a vehicle connected with a driving system;
a backward-and-forward movement changeover mechanism for carrying the vehicle backward or forward;
said hydraulic speed change mechanism includes a hydrostatic transmission pump for turning and a hydrostatic transmission motor for turning;
said hydrostatic transmission pump for turning is a variable displacement pump, and said hydrostatic transmission motor for turning is a variable displacement motor,
wherein said hydrostatic transmission pump for turning and said hydrostatic transmission motor for turning are located behind said backward-and-forward movement changeover mechanism, the hydrostatic pump and the hydrostatic transmission installed closely to one another and in the vicinity of the transmission.

4. The compact crawler type tractor according to in claim 3, wherein a changeover of the variable displacement motor is done by a manual lever or a solenoid.

5. A compact crawler type tractor having a crawler frame supporting driven idlers so as to be rotatable at both ends thereof and a driving sprocket mounted on a rear axle, and being provided with a crawler type running unit in which a crawler is windingly mounted around said driven idlers and said driving sprocket, in the lower part of an upper body,
a hydraulic speed change mechanism for steering to turn a vehicle connected with a driving system;
a backward-and-forward movement changeover mechanism for carrying the vehicle backward or forward;
said hydraulic speed change mechanism including a hydrostatic transmission pump for turning and a hydrostatic transmission motor for turning, and a throttle mounted in a pipe connecting said hydrostatic transmission pump for turning and said hydrostatic transmission motor for turning,
wherein said hydrostatic transmission pump for turning and said hydrostatic transmission motor for turning are located behind said backward-and-forward movement changeover mechanism, the hydrostatic pump and the hydrostatic transmission installed closely to one another and in the vicinity of the transmission.

6. A compact crawler type tractor comprising:
a crawler frame supporting driven idlers so as to be rotatable at both ends thereof and a driving sprocket mounted on a rear axle, and being provided with a crawler type running unit in which a crawler is windingly mounted around said driven idlers and said driving sprocket, in the lower part of an upper body;
a hydraulic speed change mechanism for steering a vehicle connected with a driving system;
said hydraulic speed change mechanism includes a hydrostatic transmission pump for turning and a hydrostatic transmission motor for turning, and a delay relief valve is mounted in a pipe connecting said hydrostatic transmission pump for turning and said hydrostatic transmission motor for turning,
wherein said hydrostatic transmission pump for turning and said hydrostatic transmission motor for turning are located behind said backward-and-forward movement changeover mechanism, the hydrostatic pump and the hydrostatic transmission installed closely to one another and in the vicinity of the transmission.

7. The compact crawler type tractor according to claim 1, wherein a gear change-over type running speed change mechanism, in which running speed is changed by a gear change-over, is equipped, and said hydrostatic transmission pump for turning is connected with an auxiliary speed change shaft of the running speed change mechanism.

8. The compact crawler type tractor according to claim 1, wherein said hydrostatic transmission motor for turning is arranged at the upper part of a transmission.

9. The compact crawler type tractor according to claim 1, wherein said hydrostatic transmission motor for turning is fixed on the rear axle.

10. The compact crawler type tractor according to claim 1, wherein said crawler frame is fixedly mounted on said upper body by at least two supporting members, and positions to be fixedly mounted are located in the rear part of the vehicle behind the front edge of said crawler type running unit.

11. The compact crawler type tractor according to claim 1, wherein said crawler frame is fixedly mounted on said upper body by at least two supporting members, and ground contact length (L2) of said crawler running unit relative to the overall length (L1) of said upper body is equal to or greater than 0.5.

12. The compact crawler type tractor according to claim 2, wherein a gear change-over type running speed change mechanism, in which running speed is changed by a gear change-over, is equipped, and said hydrostatic transmission pump for turning is connected with an auxiliary speed change shaft of the running speed change mechanism.

13. The compact crawler type tractor according to claim 3, wherein a gear change-over type running speed change mechanism, in which running speed is changed by a gear change-over, is equipped, and said hydrostatic transmission pump for turning is connected with an auxiliary speed change shaft of the running speed change mechanism.

14. The compact crawler type tractor according to claim 4, wherein a gear change-over type running speed change mechanism, in which running speed is changed by a gear change-over, is equipped, and said hydrostatic transmission pump for turning is connected with an auxiliary speed change shaft of the running speed change mechanism.

15. The compact crawler type tractor according to claim 5, wherein a gear change-over type running speed change mechanism, in which running speed is changed by a gear change-over, is equipped, and said hydrostatic transmission pump for turning is connected with an auxiliary speed change shaft of the running speed change mechanism.

16. The compact crawler type tractor according to claim 6, wherein a gear change-over type running speed change mechanism, in which running speed is changed by a gear change-over, is equipped, and said hydrostatic transmission pump for turning is connected with an auxiliary speed change shaft of the running speed change mechanism.

17. The compact crawler type tractor according to claim 2, wherein said hydrostatic transmission motor for turning is arranged at the upper part of a transmission.

18. The compact crawler type tractor according to claim 3, wherein said hydrostatic transmission motor for turning is arranged at the upper part of a transmission.

19. The compact crawler type tractor according to claim 4, wherein said hydrostatic transmission motor for turning is arranged at the upper part of a transmission.

20. The compact crawler type tractor according to claim 5, wherein said hydrostatic transmission motor for turning is arranged at the upper part of a transmission.

* * * * *